United States Patent
Liedtke et al.

(10) Patent No.: US 6,386,030 B1
(45) Date of Patent: May 14, 2002

(54) BALANCED BRIDGE TEMPERATURE REGULATOR FOR AN AIR-MASS FLOW METER

(75) Inventors: Günter Liedtke, Essen; Thomas Wienecke, Korschenbroich, both of (DE)

(73) Assignee: Pierburg AG, Neuss (DE)

( * ) Notice: Subject to any disclaimer, the term of this patent is extended or adjusted under 35 U.S.C. 154(b) by 0 days.

(21) Appl. No.: 09/258,863

(22) Filed: Feb. 26, 1999

(30) Foreign Application Priority Data

Feb. 27, 1998 (DE) .......................... 198 08 250

(51) Int. Cl.[7] .............. G01F 1/68; G01F 1/10; H03H 5/10
(52) U.S. Cl. ............... 73/204.15; 73/204.18; 323/366; 327/540; 374/183
(58) Field of Search .................. 73/204.15, 204.14, 73/204.16, 204.18, 204.19, 204.11, 118.2; 323/366, 369, 907, 316; 327/540; 374/183

(56) References Cited

U.S. PATENT DOCUMENTS

| | | | |
|---|---|---|---|
| 4,000,454 A | * 12/1976 | Brakl | .......................... 323/669 |
| 4,571,991 A | 2/1986 | Abe et al. | |
| 4,637,251 A | * 1/1987 | Carp | ........................ 73/204.19 |
| 4,658,641 A | * 4/1987 | Drews et al. | ............. 73/204.15 |
| 4,683,858 A | * 8/1987 | Sato et al. | ................ 73/204.16 |
| 5,092,164 A | * 3/1992 | Matsuoka et al. | ........ 73/204.14 |
| 5,703,476 A | * 12/1997 | Merlo et al. | ................. 323/907 |

FOREIGN PATENT DOCUMENTS

| | | |
|---|---|---|
| DE | 3433368 | 3/1986 |
| DE | 3722385 | 1/1989 |
| DE | 4130513 | 10/1996 |

* cited by examiner

Primary Examiner—Harshad Patel
(74) Attorney, Agent, or Firm—Ladas & Parry

(57) ABSTRACT

A temperature regulator, circuit for an air-mass flow meter in which the temperature regulator circuit includes a bridge circuit one of whose bridge branches contains a temperature resistor of substantially higher resistance than a heating resistor in the other bridge branch. The resistance element of the temperature resistor normally requires a large amount of space on the sensor for this purpose. In order to reduce the size of the resistance element, a voltage divider is provided to reduce the input voltage applied to the temperature resistor. In order to maintain the bridge balance, additional circuit elements are provided in the other bridge branch containing the heating resistor.

4 Claims, 1 Drawing Sheet

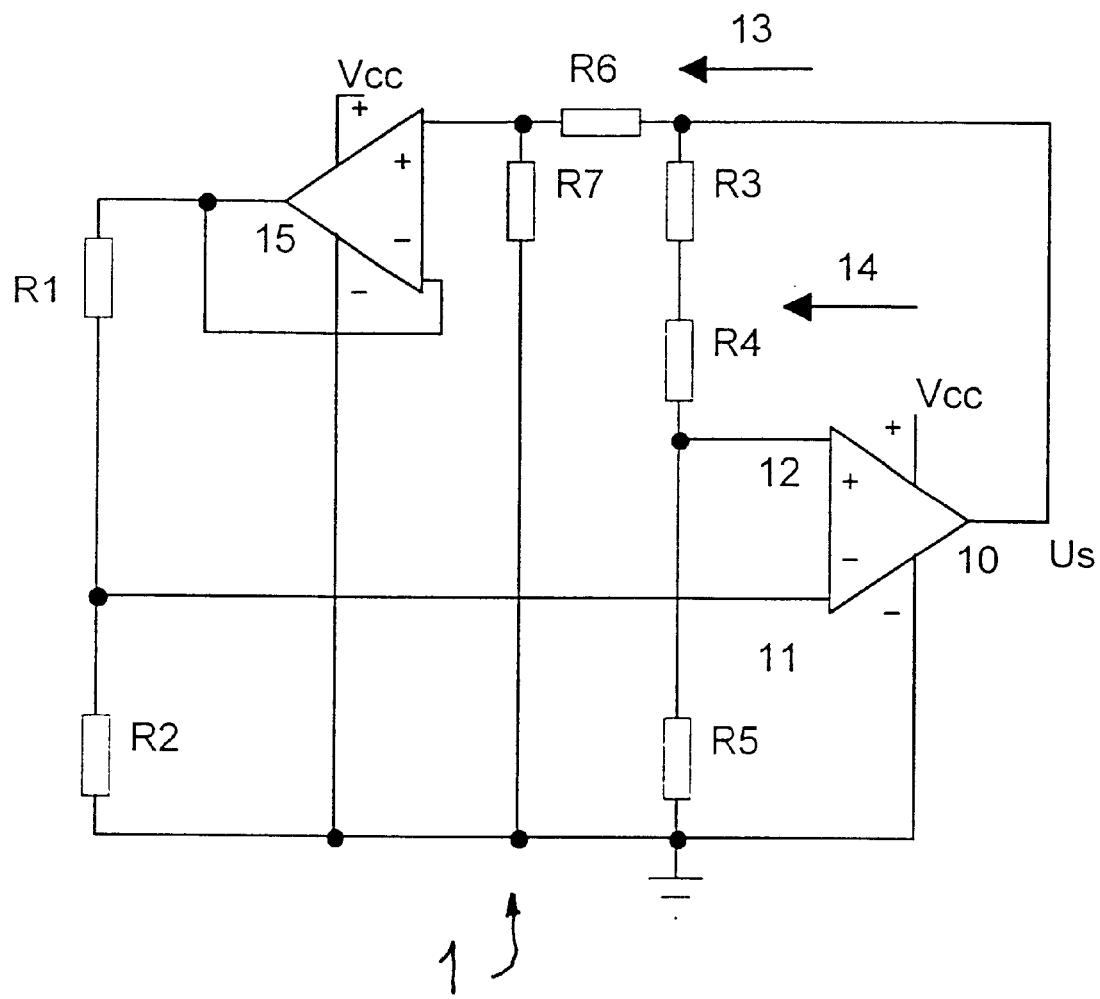

BALANCED BRIDGE TEMPERATURE REGULATOR FOR AN AIR-MASS FLOW METER

FIELD OF THE INVENTION

The invention relates to a temperature regulator, particularly for an air-mass flow meter.

BACKGROUND AND PRIOR ART

Air-mass flow meters are used particularly for determining flow of inlet air to an internal combustion engine. Heating element anemometers, also denoted thermal air-mass flow meters, are conventionally used for the design of air-mass flow meters. Two sensors or detectors are provided, one of which detects the temperature of the aspirated air and the other of which is heated to a specific temperature. The detectors are disposed in different branches of a bridge circuit. The detector that is heated and serves as the measurement sensor is cooled by the air flow depending on its velocity and temperature. The additional energy input required for bridge balance is thus a measure of the air mass flow that has passed through the detector. When there are large deviations from a reference temperature, however, measurement errors arise, due to the change in thermal conductivity of the air with respect to temperature.

In order to compensate for this measurement error, it is known, for example, to use a third sensor, as disclosed in DE 37 22 385 A1. Thereby, the temperature-dependent measurement error is corrected by suitable setting of the basic resistance value and its temperature coefficient.

A temperature regulation circuit for achieving a constant temperature of a heating resistance in a thermal air-mass flow meter is disclosed in DE 41 30 513 C2. Also, a high-resistance measuring resistor detecting the ambient temperature and a heating resistor are arranged in two different branches of a bridge circuit. By a suitable selection of resistance ratios of one resistor to the other, the heating resistor heats up in order to balance the bridge. The bridge branch with the temperature resistor essentially has a higher resistance than the bridge branch with the heating resistor, so that the intrinsic heat of the temperature resistor is kept negligibly small in order to exclude thermal measuring errors. It is a disadvantage that the high-resistance temperature resistor used for this purpose has a large space requirement for the sensor.

SUMMARY OF THE INVENTION

An object of the invention is to provide a temperature regulator, which is reduced in its size while maintaining the bridge conditions.

The invention is based on the concept that in spite of the condition that one bridge branch is configured with higher resistance compared to the other branch, in order to reduce the intrinsic resistance values, the size can also be kept small.

This is achieved by creating a voltage reduction in both bridge branches by additional means. With a smaller supply voltage, the resistance value of the temperature sensor can consequently be reduced, whereby the dimensions of the temperature sensor are also reduced. The same reduction in voltage is produced in the other bridge branch containing the heating resistor in order to keep the bridge in equilibrium. Subsequently, a post-regulation of the heating resistance is produced in a conventional manner by an operational amplifier upon an imbalance in the bridge caused by an increased temperature in the resistance of the temperature sensor. For this purpose, the resistance of the temperature sensor and the heating resistance have the same type of resistance values that change in a temperature-dependent manner. The central taps of the two bridge branches that form the null branch of the bridge are joined to the positive and negative inputs of the operational amplifier.

By the selection of smaller resistance values and the thus associated smaller dimensions of the resistor of the temperature sensor and the heating resistor, these components may also be connected to a common carrier, so that the flow direction can also be determined in a simple way.

BRIEF DESCRIPTION OF THE DRAWING

The sole FIGURE of the drawing shows a portion of a circuit of a temperature regulator. Only the essential components necessary for understanding the invention are illustrated.

DETAILED DESCRIPTION

In the drawing, there is shown a temperature regulator 1 in the form of a bridge circuit. In one branch of the bridge circuit is a temperature sensor constituted as a high-resistance temperature-dependent, variable measuring resistor R1 for detecting only the ambient temperature, in series with a resistor R2. In the second branch of the bridge, there is a temperature-dependent, variable heating resistor R3, in series with a resistor R5. Resistors R1 and R3 have positive temperature coefficients and a temperature dependence that is equalized as much as possible.

In addition to this conventional arrangement, temperature regulator 1 according to the invention has means 13, which reduces the input voltage to temperature resistor R1. Means 13 comprises a voltage divider formed by resistors R6 and R7 and a voltage follower 15. Voltage follower 15 is connected in front of measuring resistor R1 and in series with resistor R6, whereas the other resistor R7 is incorporated in the bridge circuit in parallel with voltage follower 15 and resistors R1, R2. A resistor R4 is connected in the second bridge branch in series between resistors R3 and R5 to form a further means 14 for voltage reduction. The central taps between resistors R1, R2 on the one hand, and R4, R5 on the other hand belong to the bridge null branch and are respectively connected to negative input 11 and positive input 12 of an operational amplifier 10. The bridge circuit is supplied by a supply voltage source $V_{cc}$ and is connected on one side to electrical ground, so that resistors R2, R7 and R5 have a common ground reference potential.

Supply voltage $U_s$ of the first bridge branch, i.e., the measuring branch with the temperature-measuring resistor R1, is reduced by resistors R6 and R7 acting as a voltage divider, whereby the resistance ratio of the two resistors R6, R7 determines a factor k by which supply voltage $U_s$ is reduced. This factor k is expressed by the relationship k=R7/(R6+R7) and is always less than 1. Supply voltage $V_{cc}$ in the first bridge branch is reduced by this factor k and supplied to voltage follower 15. Voltage follower 15, also referred to as an impedance transformer, is a negative feedback d.c. amplifier, whose output voltage is equal to its input voltage and which serves for decoupling temperature measuring resistor R1 from voltage divider R6, R7, in order to avoid a falsification of the voltage divider ratio. In order to maintain bridge equilibrium, the ratio of resistors R4 and R5 is likewise adjusted so that the output voltage of the other bridge branch is multiplied by the same factor k. and thus in the normal state, there is no difference between the bridge taps.

A post-regulation of temperature occurs in the conventional way, if a disruption causes decrease or increase of the temperature of heating resistor R3, and thus causing its resistance value also to change. This temperature regulation is produced via operational amplifier 10. The post-regulation is produced differently depending on the circuit and can be connected individually. Thus, a regulating transistor (not shown) can be incorporated between supply voltage source $V_{cc}$ and the bridge circuit, and operational amplifier 10 acts on this transistor in such a way that it opens it further or closes it further. However, it is also possible to apply the output of operational amplifier 10 directly to the bridge connection in front of resistors R6 and R7. In this way, regulation is always produced, so that the temperature differences between R3 and R1 is kept constant.

For example, an air-mass flow meter in the air intake manifold of an internal combustion engine can be operated with the temperature regulator 1, such that the heating element of the air-mass flow meter corresponds to heating resistor R3 of the circuit. If its elevated temperature is kept constant, the magnitude of the air flow can be evaluated from the flow of heat or the parameter associated therewith.

Thus, temperature resistor sensor R1 assumes a resistance value, which characterizes the temperature of the flowing medium. Depending on the mass of the passing air, the temperature resistor sensor R1 is cooled to a greater or lesser extent, which leads to a detuning or an imbalance of the bridge circuit. The current necessary for correcting this imbalance is then a measurement of the air mass flowing past temperature resistor R1.

Temperature regulator 1 can be modified in many ways. For example, resistors R1 and R3 can alternatively have negative temperature coefficients, but then must be reversed at inputs 11, 12.

Although the invention is disclosed with reference to a particular embodiment thereof, it will become apparent to those skilled in the art that numerous modifications and variations can be made which will fall within the scope and spirit of the invention as defined by the attached claims.

What is claimed is:

1. A temperature regulator for an air-mass meter in an air intake manifold of an internal combustion engine comprising a bridge circuit having a first branch including a measuring resistor having a temperature-dependent variable resistance for detecting ambient temperature, and a second branch including a heating resistor having a temperature-dependent variable resistance, said first and second branches having central taps, a bridge null branch connected to said central taps, said bridge null branch including an operational amplifier having positive and negative inputs connected to said central taps to correct any bridge imbalance based on any voltage difference in the bridge null branch, means connected in front of said measuring resistor for reducing voltage supplied to said measuring resistor by a factor k, and further means in the second bridge branch after the heating resistor for reducing voltage in said second branch by said factor k to maintain bridge balance, wherein said means for reducing voltage supplied to said measuring resistor comprises a voltage divider including first and second resistors and a voltage follower connected in front of said measuring resistor in series with the first resistor of the voltage divider, the second resistor of said voltage divider being connected in parallel to said voltage follower and to said measuring resistor.

2. The temperature regulator according to claim 1, further comprising a resistor in said first branch of said bridge circuit in series with said measuring resistor and in parallel with said second resistor of said voltage divider.

3. The temperature regulator according to claim 1, comprising a common carrier to which said measuring resistors and said heating resistor are connected.

4. A temperature regulator for an air-mass meter in an air intake manifold of an internal combustion engine comprising a bridge circuit having a first branch including a measuring resistor having a temperature-dependent variable resistance for detecting ambient temperature, and a second branch including a heating resistor having a temperature-dependent variable resistance, said first and second branches having central taps, a bridge null branch connected to said central taps, said bridge null branch including an operational amplifier having positive and negative inputs connected to said central taps to correct any bridge imbalance based on any voltage difference in the bridge null branch, means connected in front of said measuring resistor for reducing voltage supplied to said measuring resistor by a factor k, and further means in the second bridge branch after the heating resistor for reducing voltage in said second branch by said factor k to maintain bridge balance, wherein said second bridge branch includes a further resistor in series with said heating resistor, said further means comprising another resistor in said second branch in series with said heating resistor to form a further voltage divider, the central tap of said second branch being between said further resistor and said another resistor.

* * * * *